July 23, 1957 McIVOR L. PARKER 2,800,384

WIDE FREQUENCY RANGE RECORDING AND REPRODUCING APPARATUS

Filed June 22, 1953

3 Sheets-Sheet 1

INVENTOR

McIVOR L. PARKER

BY

H. T. Godfrey

ATTORNEY

INVENTOR

McIVOR L. PARKER

BY H. L. Godfrey
ATTORNEY

July 23, 1957 McIVOR L. PARKER 2,800,384

WIDE FREQUENCY RANGE RECORDING AND REPRODUCING APPARATUS

Filed June 22, 1953 3 Sheets-Sheet 3

INVENTOR

McIvor L. Parker

BY

H. L. Godfrey

ATTORNEY

United States Patent Office 2,800,384

Patented July 23, 1957

2,800,384

WIDE FREQUENCY RANGE RECORDING AND REPRODUCING APPARATUS

McIvor L. Parker, Arlington, Va.

Application June 22, 1953, Serial No. 363,424

1 Claim. (Cl. 346—74)

(Granted under Title 35, U. S. Code (1952), sec. 266)

The invention described herein may be manufactured and used by or for the Government of the United States for governmental purposes without the payment to me of any royalty thereon in accordance with the provisions of the act of April 30, 1928 (ch. 460, 45 Stat. L. 467), 35 U. S. C. 266.

This invention relates generally to wide frequency range recording and reproducing apparatus, and more specifically to a method and means for such recording in which the recording strip is moved at a relatively low speed and the signal is recorded in successive transverse paths on the strip.

Techniques for recording frequencies in the audible range and up to 100 kilocycles by magnetic and photographic means are well known and widely used. Such techniques require the movement of the recording medium past a stationary recording head at speeds up to several feet per second. In order to extend the upper limit of frequency that may be successfully recorded it becomes necessary to increase the speed at which the recording medium passes the recording head. For recording information of short duration phenomena very high tape and film speeds have been employed in laboratories. However, when the material to be recorded continues for relatively long periods of time, problems of inordinate tape or film length are posed when high tape or film speeds are employed. In addition, the higher the speed of the strip, the more susceptible the apparatus is to malfunctioning due to mechanical failure such as strip breakage.

Preservation of a record of signals containing high frequency components is desirable both for historical purposes and, in the case of radio broadcasting in general, and television broadcasting in particular, for the purpose of delayed transmission either by the station originating the program or by other broadcasting stations.

As no satisfactory means exist to permit the use of magnetic tape recording or other direct methods of recording, for frequencies of the order of several megacycles, present practice is to convert television signal information back to a picture, or sequential portions of a picture, by means of a cathode ray tube and to photograph the resulting picture.

Although applicant's invention can be advantageously used with photographic recording strips for the direct reproduction of a picture or for recording the signal information in variations of light intensity, it is particularly advantageous in that it permits the use of magnetic tape for recording signals having a frequency range of several megacycles or more. The use of a magnetic tape has a definite advantage over the use of film since the signal can be erased from the magnetic tape and the tape re-used, while on the other hand the film cannot be re-used but also must be developed before it is used.

Experimental laboratories also need a system for recording wide frequency range signal phenomena such as transients. Present means of recording such signals either employ photography of a visual representation of the information on a device such as the cathode ray tube or moving a ribbon of magnetically impregnated material with respect to a fixed gap of a magnetic recording head. These methods impose serious limits as to the upper frequency limit which can be successfully recorded and reproduced by reason of the inordinate speed at which the recording medium would have to be moved.

An object of this invention is to provide a method and apparatus for recording and reproducing signals having a wide frequency range on a recording strip moving at a relatively low speed.

Another object of this invention is to provide a method and apparatus for recording and reproducing television signals on magnetic tape.

Another object of this invention is to provide a method and means for recording and reproducing signals on a recording strip in a series of paths transverse to the strip.

Other objects and advantages of this invention will appear to those skilled in the art from a reading of the following specification considered in connection with the accompanying drawings in which.

Figure 1:
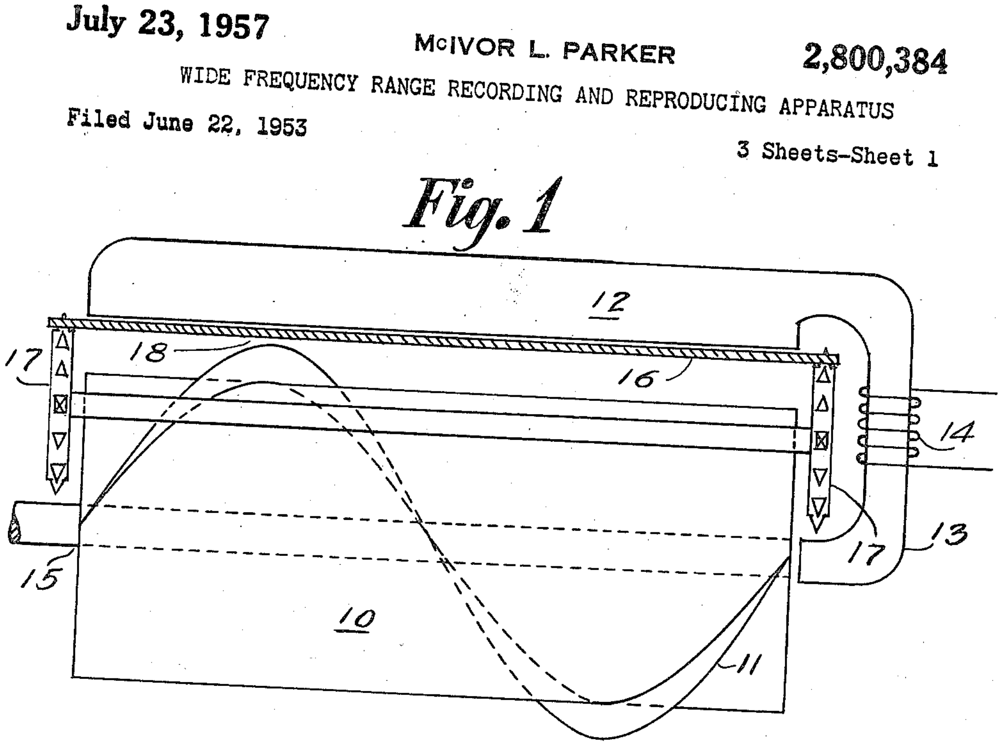
Fig. 1 shows a front elevational view of a recording and reproducing apparatus embodying the principles of this invention.
Figure 2:
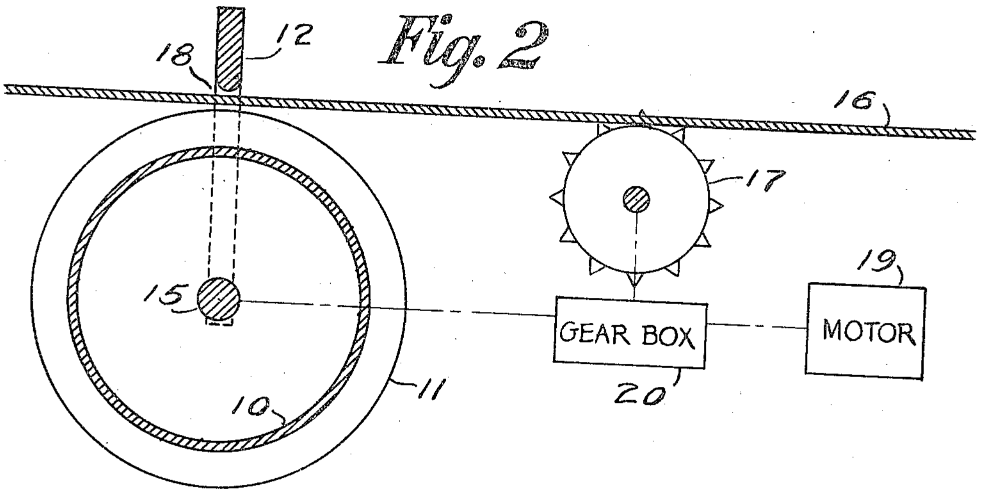
Fig. 2 shows a side elevational view in section, partly schematic, of the apparatus shown in Fig. 1.

As seen in Figs. 1 and 2, there is mounted on the cylinder 10 a helical blade 11 of magnetic material. Mounted parallel to the axis of cylinder 10 and in close proximity to the outer tip of the helical blade 11 is a bar of magnetic material 12. The bar 12 has an extension 13 which is magnetically coupled to the blade 11. This magnetic coupling could be through the end of a magnetic shaft 15 on which the cylinder 10 rotates and through magnetic discs or arms (not shown) connecting the shaft 15 with the blade 11. A coil 14 is wound on the extension 13 connecting the bar 12 with the shaft on which the drum 10 rotates. The signal to be recorded is impressed across the coil 14. Biasing and erasing signals may also be fed into this circuit. If desired, a separate erasing head (not shown) may be mounted just ahead of the recording bar.

A magnetic recording strip 16 is positioned between the blade 11 and the bar 12. This strip may be a strip of magnetizable metal but is preferably a paper or cellulose strip coated or impregnated with magnetizable particles. The strip 16 is moved by sprocket wheels 17, the teeth of which engage holes in either edge of the recording strip 16. As shown in Fig. 2, a motor 20 turns the cylinder 10 and the blade 11 continuously at a relatively high rate of speed. A gear box 20 is provided to connect the motor 19 to the sprocket wheels 17 and turn them at a lower speed which bears a predetermined ratio to the speed of the cylinder 10. The direct coupling of drive to sprocket assures positive alignment or register of the recording strip if removed and replaced. By making the blade 11 of appreciable height, and providing it and the bar 12 each with a tapering edge, the magnetic flux is caused to concentrate at gap 18.

In the operation of the above described device it will readily be seen, particularly from Fig. 1, that as the cylinder 10 and the blade 11 revolve, the gap 18 between the blade 11 and the bar 12 will pass transversely across the strip 16 once for every rotation of the cylinder 10. If the recording strip 16 is slowly moved, the succeeding path of the gap 18 along the recording strip 16 will be slightly displaced with respect to the preceding path. If a varying signal is impressed on the coil 14 a correspondingly varying magnetic field of elemental area, corresponding approximately to the intersection of the helical blade 11 and the tapered edge of bar 12, will make successive transverse and slightly diagonal paths across the recording strip altering the magnetic character of the strip.

For example, a one-turn helical blade 11 having a length along the axis of cylinder 10 of 10″ length and rotating at a speed of 30 revolutions a second would produce a movement of the gap 18 along the recording strip 16 of 300 inches per second. An increase in either the axial length of the helical blade 11 or the speed of rotation of cylinder 10 would produce a corresponding increase in the rate of movement of the point of intersection. If the cylinder 10 were equipped with 4 blades, each extending circumferentially for 1/4 of a turn, the gap speed would increase 4 times. The speed at which the recording strip 16 is moved will be determined only by the width of the strip of recording material necessary to contain the magnetic impression without undesirable coupling to the adjacent strip on the succeeding revolutions of the cylinder 10. The strip 12 will have to be moved at such a rate that it will be moved by the aforementioned width of strip once for every rotation of cylinder 10.

Figure 3:
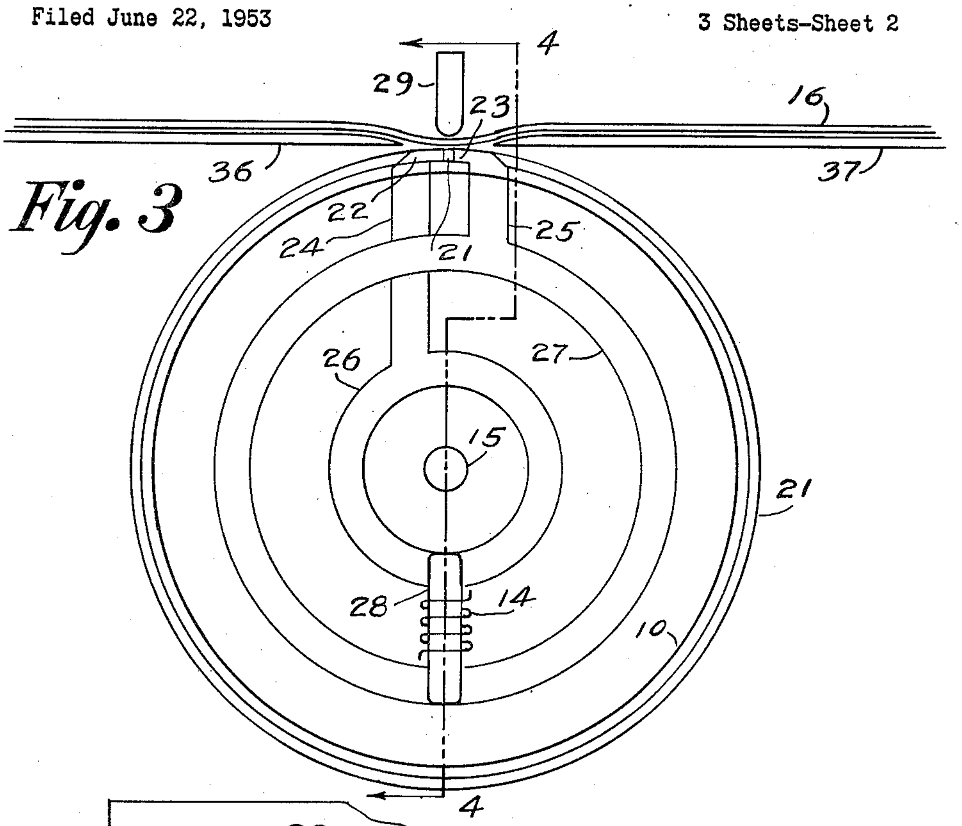
Fig. 3 is an elevational end view of a modification of the device shown in Fig. 1 in which a lateral gap is used.

Reproduction of the information recorded in the above described manner by the device of Figs. 1, 2 and 3 may be achieved by using the same apparatus used for recording. As the gap 18 retraces the transverse recording paths, the magnetic flux flowing through the magnetic circuit will vary in accordance with the varying characteristics previously imparted to the succeeding elemental areas of the strip 16. This varying magnetic flux will induce a voltage across the coil 14 which will be representative of the signal previously recorded. The voltage in coil 14 may be used to drive conventional electronic amplifying and other circuits to utilize the information.

Figure 4:
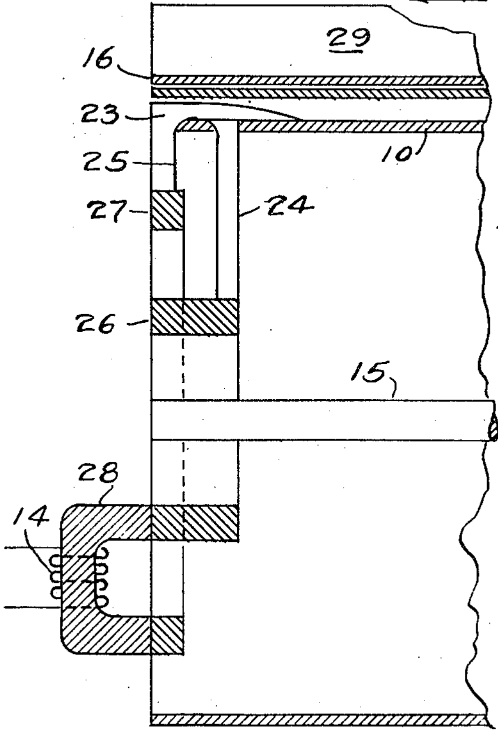
Fig. 4 is a partial sectional view in elevation of the device shown in Fig. 3.

In some cases it may be desirable to impress the magnetic flux on the recording medium by the use of a magnetic gap extending longitudinally of the recording strip 16 rather than through it. This can be done, as shown in Figs. 3 and 4, by substituting for the helical blade 11 in Figs. 1 and 2, a helical slot 21 formed between two helical strips of magnetic material 22 and 23 mounted on the cylindrical support 10. Cylindrical support 10 may be of non-magnetic material or so constructed as to keep helical members 22 and 23 magnetically separated.

The slot-forming members 22 and 23 are respectively connected through members 24 and 25 to inner and outer slip rings 26 and 27. A non-rotating yoke 28 on which is wound a coil 14, corresponding to the coil 14 of Fig. 1, provides a bridge between slip rings 26 and 27. Connecting members 24 and 25, slip rings 26 and 27, and yoke 28 are all of material permeable to a magnetic flux. A backing bar 29 in Fig. 4 is made of non-magnetic material and serves only as a guide to hold the recording strip 16 in proximity with the recording medium 16. Flat members 36 and 37 form a support for recording strip 16 as it approaches and leaves the helical gap 21.

When the device of Fig. 3 is recording, the signal is applied to the coil 14 and produces in the yoke 27 a varying flux which flows through the slip ring 26 connecting member 24, slot-forming member 22, slot 21, slot-forming member 23, connecting member 25, and connecting ring 27. The varying magnetic flux across the slot 21 is in close proximity to the recording strip 16 and will leave a magnetic record on the strip. As the helical gap 21, formed by the members 22 and 23 rotates, the intersection of the gap 21 and the plane of the recording strip 16 will cross transversely of the recording strip once for each rotation and the varying magnetic flux across the gap 28 will change the magnetic character of the tape to leave a signal recorded thereon.

The signal recorded by the apparatus represented in Fig. 4 may be reproduced on the same apparatus. As the gap 21 travels across the recording medium 16 the flux flowing through the gap 21 will be altered by the proximity of the magnetized record 16 and its varying characteristic. The varying flux flowing through the magnetic circuit including elements 22—28 will induce a varying electrical potential in coil 14 which will be connected to the amplifying and reproducing circuits.

Instead of introducing a varying magnetic flux through slip rings to the rotating helical members 22 and 23, as shown in Fig. 3, alternatively the coil 14 supplying the magnetomotive force could be arranged to rotate with the helical members 22 and 23 and the varying current could be supplied to the coil 13 through electrically conductive slip rings.

Figure 5:
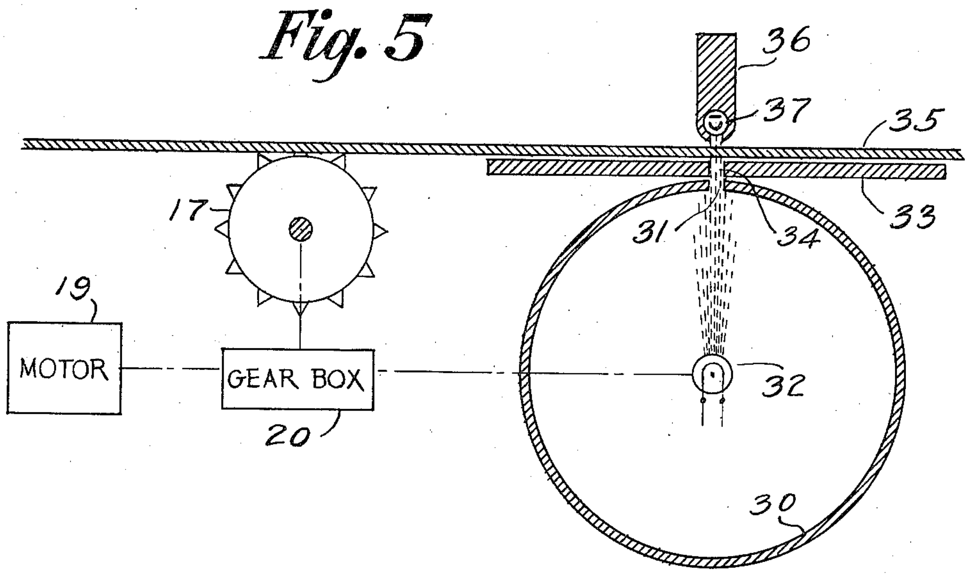
Fig. 5 is a side elevational sectional view, partly schematic, of an alternate embodiment of this invention.

The principle set forth above may be applied to photographic recording, as shown in Fig. 5, by employing an opaque cylinder 30 provided with a spiral slot 31 illuminated from within the cylinder 30 by a light source 32. In this embodiment a plane opaque member 33 is placed in close proximity to the cylinder 30 and is provided with a narrow linear slot 34 which runs parallel to the axis of the cylinder 30 at the point where the member 33 is substantially tangent to the cylinder 30. Guide bar 36 is provided above the photosensitive recording strip 35, which may be commercial photographic film. The recording strip 35 is moved by sprocket wheels 17 which engage holes in the edges of the strip 35. Sprocket wheels 17 and cylinder 30 are rotated by motor 20 and gear box 21 as in Fig. 2.

The information to be recorded is made to vary the intensity of the light source 32 by means well known to those skilled in the art. When the cylinder 30 rotates, the intersection of the helical slot 31 and the linear transverse slot 34 will cross the recording strip 35 once for each rotation of the cylinder 30. The light source 32, varying in accordance with the signal to be recorded, places a varying latent image on the photosensitive recording strip 35 which may later be developed to produce a visible record. The sprocket wheels 17 slowly move the strip 35 transversely to the linear slot 34 to cause each of the transverse excursions of the intersection 36 across the strip 35 to be longitudinally displaced as in the case of magnetic recording.

As shown in Fig. 5, guide bar 36 may form a housing for a photoelectric pickup device, or photocell, 37 running the entire length of the bar to reproduce the material recorded photographically. With this arrangement the developed photographic strip is moved transversely to slot 34 by sprocket wheels 17 as cylinder 30 is rotated. The light from source 32, now maintained at constant intensity, passes through the photographic record and impinges on photoelectric cell 37. The intensity of the light reaching photoelectric cell 37 varies in accordance with the signal recorded on the photographic strip, causing variations in the output of the photoelectric cell 37 which may be used to drive conventional electronic circuits.

Should it be desired to use the principle shown above for electrostatic recording, the blade 11 and the bar 12 of Fig. 1 could be replaced by suitable electrical conductors insulated from each other. The information to be recorded would be applied to these conductors in the form of a varying electric potential. This would produce a varying potential gradient across the gap 18 which could be imparted to a suitable recording means in the form of a permanent electric charge. This permanent electric charge may be produced by setting up an electrical stress in the recording strip while it is molecularly pliable. The recording strip would then be permitted to become molecularly rigid in this condition. This might be done by using a plastic recording strip in place of the magnetic recording strip 16 of Fig. 1, heating the plastic strip just before it enters under the bar 12, and refrigerating it, if necessary, as it leaves the bar 12 to permanently entrap the electrical stress produced by the potential across the gap 25.

In all of the aforementioned devices it may prove desirable to make the helical member slightly longer than one turn so that recording will begin on the succeeding diagonal before it terminates on the prior diagonal in order to avoid the possible effects of a short discontinuity.

It will be understood that the above described devices are exemplary only and that other modifications within the scope of the appended claim will occur to those skilled in the art.

What is claimed is:

A system for recording sound impulses at high speeds while moving the recording medium at a lesser speed, which comprises a shaft, a cylindrical drum of non-magnetic material mounted for rotation about the shaft, helical strips of magnetic material carried upon the outer surface of the drum spaced from each other to form a helical slot upon the face of the drum, means for magnetically exciting the gap formed by the slot, a recording strip of substantial width, means for moving the strip across the surface of the drum parallel to the longitudinal axis of the drum, means for rotating the drum whereby the helical slot repeatedly scans the strip transversely at high speeds, and means for impressing a signal across the helical strips to vary the magnetic flux in the gap between the strips to leave a magnetic record of the signal upon the recording strip.

References Cited in the file of this patent

UNITED STATES PATENTS

| | | |
|---|---|---|
| 1,859,828 | Jenkins | May 24, 1932 |
| 2,188,650 | Clark | Jan. 30, 1940 |
| 2,379,438 | Hagan | July 3, 1945 |
| 2,666,807 | Hunt | Jan. 19, 1954 |